United States Patent
Gallagher et al.

(10) Patent No.: US 10,809,373 B2
(45) Date of Patent: Oct. 20, 2020

(54) METHODS FOR FORMING 3D IMAGE DATA AND ASSOCIATED APPARATUSES

(71) Applicant: PBU (UK) LTD., Cleveland (GB)

(72) Inventors: Anthony Gallagher, Morpeth (GB); Alexander Robinson, Morpeth (GB)

(73) Assignee: PBU (UK) LTD., Cleveland (GB)

( * ) Notice: Subject to any disclaimer, the term of this patent is extended or adjusted under 35 U.S.C. 154(b) by 239 days.

(21) Appl. No.: 15/779,262

(22) PCT Filed: Nov. 15, 2016

(86) PCT No.: PCT/EP2016/077750
§ 371 (c)(1),
(2) Date: May 25, 2018

(87) PCT Pub. No.: WO2017/089184
PCT Pub. Date: Jun. 1, 2017

(65) Prior Publication Data
US 2018/0329052 A1    Nov. 15, 2018

(30) Foreign Application Priority Data

Nov. 25, 2015    (GB) .................................. 1520829.1

(51) Int. Cl.
*G01S 13/88*    (2006.01)
*G01S 13/02*    (2006.01)
(Continued)

(52) U.S. Cl.
CPC .............. *G01S 13/885* (2013.01); *B61K 9/08* (2013.01); *B61L 23/048* (2013.01);
(Continued)

(58) Field of Classification Search
CPC ....... G01S 13/885; G01S 13/426; G01V 3/17; G01V 3/36; H01Q 1/1207
(Continued)

(56) References Cited

U.S. PATENT DOCUMENTS 4,967,199 A    10/1990   Gunton et al.
2002/0105469 A1    8/2002   Albats, Jr. et al.
(Continued)

FOREIGN PATENT DOCUMENTS

| | | |
|---|---|---|
| CN | 104701617 A | 6/2015 |
| DE | 202011108656 U1 | 3/2012 |
| GB | 2224408 A | 5/1990 |

OTHER PUBLICATIONS

UKIPO, Search Report for GB Patent Application No. 1520829.1, dated Feb. 29, 2016.
(Continued)

*Primary Examiner* — Bo Fan
(74) *Attorney, Agent, or Firm* — NK Patent Law (57) ABSTRACT

A method for forming 3D image data representative of the subsurface of infrastructure located in the vicinity of a moving vehicle. The method includes: rotating a directional antenna, mounted to the moving vehicle, about an antenna rotation axis; performing, using the directional antenna whilst it is rotated about the antenna rotation axis, a plurality of collection cycles in which the directional antenna emits RF energy and receives reflected RF energy; collecting, during each of the plurality of collection cycles performed by the directional antenna.

14 Claims, 5 Drawing Sheets

(51) Int. Cl.
*G01S 13/89* (2006.01)
*H01Q 1/32* (2006.01)
*H01Q 13/02* (2006.01)
*G01S 13/42* (2006.01)
*G01V 3/17* (2006.01)
*H01Q 1/12* (2006.01)
*G01V 3/36* (2006.01)
*B61L 23/04* (2006.01)
*H01Q 3/08* (2006.01)
*B61L 25/02* (2006.01)
*B61K 9/08* (2006.01)
*G01S 19/13* (2010.01)
*H01Q 3/04* (2006.01)
*G01S 13/86* (2006.01)
*G01V 3/16* (2006.01)

(52) U.S. Cl.
CPC ........ *B61L 25/025* (2013.01); *G01S 13/0209* (2013.01); *G01S 13/426* (2013.01); *G01S 13/89* (2013.01); *G01S 19/13* (2013.01); *G01V 3/17* (2013.01); *G01V 3/36* (2013.01); *H01Q 1/1207* (2013.01); *H01Q 1/3216* (2013.01); *H01Q 1/3233* (2013.01); *H01Q 3/04* (2013.01); *H01Q 3/08* (2013.01); *H01Q 13/02* (2013.01); *B61L 2205/04* (2013.01); *G01S 13/86* (2013.01); *G01S 13/865* (2013.01); *G01V 3/16* (2013.01)

(58) Field of Classification Search
USPC .......................................... 342/22, 84, 426
See application file for complete search history.

(56) References Cited

U.S. PATENT DOCUMENTS

2007/0132630 A1* 6/2007 Beckner ................. G01S 13/34
 342/22
2014/0285375 A1* 9/2014 Crain ..................... G01S 17/86
 342/25 A

OTHER PUBLICATIONS

ISA/EP, International Search Report and Written Opinion for PCT Patent Application No. PCT/EP2016/077750, dated Feb. 22, 2017.

* cited by examiner

METHODS FOR FORMING 3D IMAGE DATA AND ASSOCIATED APPARATUSES

CROSS REFERENCE TO RELATED APPLICATION(S)

This application is a 371 National Phase Application of PCT Patent Application No. PCT/EP2016/077750 filed on Nov. 15, 2016, which claims priority to United Kingdom Patent Application No. 1520829.1 filed on Nov. 25, 2015, the entire content of all of which is incorporated by reference herein.

FIELD OF THE INVENTION

This invention relates to a method for forming 3D image data representative of the subsurface of infrastructure located in the vicinity of a moving vehicle, and associated apparatuses.

BACKGROUND

Radar has been demonstrated to be an effective tool to conduct investigations of subsurface features and to evaluate the condition of transport infrastructure.

Figure 1:
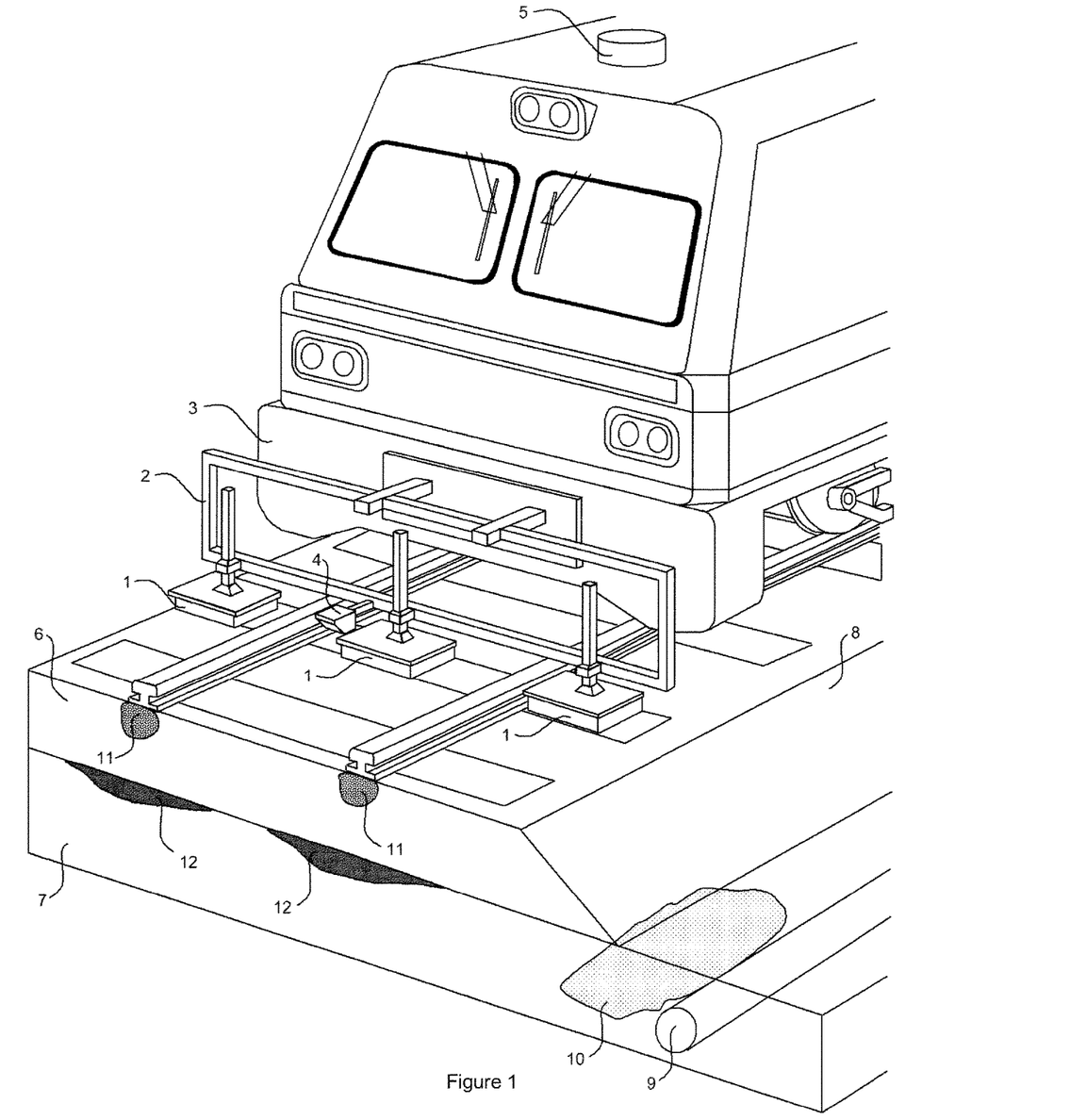
FIG. 1 shows an example radar apparatus for inspecting rail track ballast and subgrade made in accordance with conventional techniques and off-the-shelf components.

FIG. 1 shows an example radar apparatus for inspecting rail track ballast 6 and subgrade 7 made in accordance with conventional techniques and off-the-shelf components. The radar apparatus of FIG. 1 includes an array of three air-coupled antennas 1 secured by a mounting bracket 2 to the front of a rail vehicle 3. The boresight of each antenna 1 is aligned with the vertical axis so the angle of incidence of the electromagnetic wave at the air-ground interface relative to the vertical axis is zero. Each antenna emits an RF waveform consisting of sets of short-period ultra-wideband ("UWB") pulses (commonly Ricker wavelets) at a centre frequency determined by the antenna specifications. Antenna selection depends upon investigative requirements, for example: 300-500 MHz is typically used to detect large scale features such as pipes, culverts and voids at depths of 0-3 metres; 1 GHz is effective at detecting small objects <1 metre from the surface; and 2 GHz is used to determine ballast fouling severity. Large variations in the subsurface dielectric permittivity that occur over small distances cause strong reflections that are processed and recorded by a control unit in the vehicle. The backscattered RF energy signals resulting from every emitted UWB pulse in a set are incoherently summed together to increase the signal to noise ratio (this technique is called stacking). The data set obtained shows the reflected RF energy signal amplitude as a function of the two-way travel time, which is known as a trace or A-scan. As the rail vehicle moves along the track, traces are collected and assembled to create 2D image data representative of a longitudinal cross section (or B-scan) of the subsurface. In order for this cross section to accurately represent subsurface features, the distance travelled by the rail vehicle 3 from a reference point must be determined precisely. A tachometer or a laser Doppler encoder 4 can provide the control unit with linear position data to georeference individual traces. Additionally, a GPS system 5 may be employed to map georeference features of interest to a global coordinate system, e.g. using latitude/longitude in the WGS84 global coordinate system.

The present inventors have observed that current subsurface and infrastructure investigation radar apparatuses, such as the apparatus illustrated in FIG. 1, have inherent limitations. For example, because the antenna array cannot extend laterally beyond the vehicle, and the antennas are vertically fixed, the region of investigation is confined to the ballast 6 and subgrade 7 directly under the vehicle. Problems that occur at greater offsets from the track centre line will therefore remain undetected. An example of this is shoulder ballast 8 that has become fouled. For a typical railway, the ballast 6 typically consists of crushed stones which interlock to hold the track stationary against applied loads, distribute those loads across the subgrade and facilitate drainage. The subgrade 7 is usually made of compressed earth to provide a stable support for the ballast 6. Approximately thirty percent of its volume is comprised of air voids, with each void being between 11-29 mm in average diameter. Any fouling caused by breakdown or small particle or water infiltration into the voids can compromise its ability to resist loads. Shoulder ballast 8 is particularly susceptible to fouling from environmental debris, and this can impede lateral drainage from the entire ballast. Another example is a damaged pipe 9 that creates a void 10 adjacent to the shoulder ballast, which could potentially increase in volume undetected until it compromises track integrity.

Further difficulties with current subsurface and infrastructure investigation radar apparatuses observed by the present inventors include detecting ballast breakdown under the rails 11, since the rails 11 reflect practically all incident radio frequency energy. This creates a radar shadow under the rails 11 and causes a ring down effect (a type of resonance) that causes horizontal bands to appear on the image which obscure subsurface features, due to multiple reflections between the rail and the antenna. The antennas must therefore be positioned to reduce/minimize such interactions, and this is normally achieved by positioning the antennas between the rails 11, meaning that the system cannot determine the condition of the ballast directly under the rails. This also adversely impacts investigation of the ballast-subgrade interface, as the greatest deformations generally occur under the rails. Ballast material is forced into the subgrade causing ballast pockets 12 to form that can collect water. Moreover, because the array consists of only three antennas, it suffers from poor lateral spatial sampling density (measurements at only three lateral points) and is incapable of determining the lateral geometry of the infrastructure located beneath the antennas with any degree of accuracy. The creation of 3D image data using the subsurface and infrastructure investigation radar apparatus of FIG. 1 requires interpolation between adjacent cross sections which creates defects/artefacts, due to a lack of lateral sampling density (a higher lateral sampling density would be necessary to prevent image distortion due to spatial aliasing). As a result, the analysis of data for many current subsurface and infrastructure investigation radar apparatuses is restricted to the examination of individual cross sections in isolation to identify anomalies.

The present invention has been devised in light of the above considerations.

SUMMARY OF THE INVENTION

A first aspect of the invention may provide:
A method for forming 3D image data representative of the subsurface of infrastructure located in the vicinity of a moving vehicle, the method including:
rotating a directional antenna, mounted to the moving vehicle, about an antenna rotation axis;
performing, using the directional antenna whilst it is rotated about the antenna rotation axis, a plurality of collection cycles in which the directional antenna emits RF energy and receives reflected RF energy;

collecting, during each of the plurality of collection cycles performed by the directional antenna:
  (i) radar data representative of reflected RF energy received by the directional antenna during the collection cycle;
  (ii) angular position data representative of an angular position of the directional antenna about the antenna rotation axis during the collection cycle; and
  (iii) translational position data regarding a translational position of the directional antenna during the collection cycle;

processing the radar data, the angular position data and the translational position data collected during each of the plurality of collection cycles to form 3D image data representative of the subsurface of infrastructure located in the vicinity of the moving vehicle.

In this way, 3D image data providing information about the subsurface of infrastructure located around (below, above and to the side of) the moving vehicle can be obtained using only a single transect. Moreover, measurements can be obtained over a diffuse range of positions lateral to a direction of movement of the vehicle (whereas e.g. the system of FIG. 1 discussed above only obtained measurements in three distinct positions lateral to the direction of movement of the vehicle).

For the purposes of this disclosure, a directional antenna may be understood as an antenna which emits and/or receives more power in one or more specific directions, compared with other directions. A primary radiation axis of a directional antenna can be understood as an axis along which the directional antenna radiates maximum power. Herein, the term "boresight" may be used interchangeably with "primary radiation axis" in connection with a directional antenna.

For the purposes of this disclosure, RF energy may be understood as electromagnetic radiation having a frequency in the range 300 GHz to 3 kHz.

For the purposes of this disclosure, a "transect" refers to a path along which the boresight of the directional antenna intersects the infrastructure located in the vicinity of the moving vehicle (e.g. ground, tunnel walls).

Preferably, the directional antenna is mounted to the moving vehicle such that a plane perpendicular to the antenna rotation axis at least partially faces in a direction of movement of the vehicle (in the example depicted below, this will be the case for θ<90 degrees).

Preferably, the directional antenna is mounted to the moving vehicle (e.g. as described in connection with the second aspect of the invention, below) such that an angle θ between the antenna rotation axis and a direction of movement of the vehicle can be varied, e.g. between 0 and π/2 (90 degrees).

Preferably, the method includes varying an angle θ between the antenna rotation axis and a direction of movement of the vehicle, e.g. using an actuator (e.g. as described in connection with the second aspect of the invention, below).

Preferably, the method includes varying an angle θ between the antenna rotation axis and a direction of movement of the vehicle to a non-zero value such that a primary radiation axis of the directional antenna has a component of movement that is opposite to a direction of movement of the vehicle whilst the primary radiation axis of the directional antenna points beneath the moving vehicle. In this way, the spatial sampling density beneath the moving vehicle is made higher than the sampling density above the vehicle, which is particularly useful for investigating the subsurface of infrastructure located beneath the moving vehicle.

As discussed in more detail below, varying θ can alter the lateral extent of a region from which radar data is collected as well as sampling density of measurements obtained. Therefore, the ability to vary θ may be useful to allow the measurements to be tailored to the infrastructure of interest.

Preferably, the directional antenna is mounted to the moving vehicle (e.g. as described in connection with the second aspect of the invention, below) such that an angle φ between a primary radiation axis of the directional antenna and a plane perpendicular to the antenna rotation axis can be varied.

Preferably, the method includes varying an angle φ between a primary radiation axis of the directional antenna and a plane perpendicular to the antenna rotation axis, e.g. using an actuator (e.g. as described in connection with the second aspect of the invention, below).

As discussed in more detail below, where θ is close to π/2, the vehicle to which the device is mounted can obscure the boresight of the directional antenna. In these cases, changing φ to a non-zero value can move the primary radiation axis of the directional antenna past the vehicle so that the amount by which the boresight is intersected by the vehicle is reduced.

In some cases, typically where θ is close to zero, φ may be preferably zero. Preferably, the RF energy emitted by the directional antenna during each collection cycle includes an ultra-wideband ("UWB") pulse.

Each UWB pulse preferably has a bandwidth that exceeds the lesser of 500 MHz or 20% of fractional bandwidth.

Each UWB pulse preferably has a pulse length of duration 2 ns or less. For the purposes of this disclosure, fractional bandwidth may be defined as the bandwidth of an antenna divided by its centre frequency.

Each UWB pulse emitted by the directional antenna may have a centre frequency that is chosen depending on investigation requirements. This centre frequency may be in the range of 300 MHz to 2.5 GHz, which is suitable for most transport infrastructure applications.

Of course, forms of RF energy other than UWB pulses could be used, as would be appreciated by a skilled person.

The directional antenna may include one or more antenna components. For example, the directional antenna may include a transmit horn antenna (configured to emit RF energy) and a receive horn antenna (configured to receive reflected RF energy). However, it is also possible for the directional antenna to include a single antenna component configured to both emit RF energy and receive reflected RF energy.

The/each antenna component is preferably a non-dispersive antenna component, such as a TEM horn antenna or a resistively loaded dipole antenna, since these can be used with a pulsed radar technique. However, if a non-pulsed radar technique were used, then other types of antenna component may be used.

The angular position data may be collected using an optical encoder, for example.

The translational position data may be collected using a tachometer, laser Doppler encoder, or a GPS device, for example.

The method may include using a GPS device to collect position data reflecting the position of the directional antenna in a global coordinate system, e.g. WGS84.

Although the position data collected by the GPS device could be used as the translational position data, this might not be preferable if more accurate translational position data could be collected by another means (e.g. a tachometer or laser Doppler).

The method may include using position data collected by a GPS device to map the 3D image data to a global coordinate system, e.g. WGS84. This may be useful if the translational position data is not collected by a GPS device (e.g. because a GPS device does not provide a desired level of accuracy).

The method may include storing the radar data, the angular position data and the translational position data collected during each of the plurality of collection cycles in a memory device (e.g. a hard disk). The memory device may be located on the vehicle. In this case, processing the collected radar data may be performed off the vehicle, e.g. using the radar data, the angular position data and the translational position data stored in the memory device.

However, processing the collected radar data could potentially be performed by a processing unit on the vehicle.

Processing the collected radar data, angular position data and translational position data to form the 3D image may include summing the collected RF energy coherently or incoherently, using techniques known in the art. Incoherent summing is generally easier and cheaper, but coherent summing will generally produce a higher quality 3D image.

The method may be performed using a plurality of directional antennas, since this may allow further 3D image data to be obtained.

For example, the method may additionally include:
rotating a further directional antenna, mounted to the moving vehicle, about a further antenna rotation axis;
performing, using the further directional antenna whilst it is rotated about the further antenna rotation axis, a plurality of further collection cycles in which the further directional antenna emits RF energy and receives reflected RF energy;
collecting, during each of the plurality of further collection cycles performed by the further directional antenna:
  (i) further radar data representative of reflected RF energy received by the further directional antenna during the further collection cycle;
  (ii) further angular position data representative of an angular position of the further directional antenna about the further antenna rotation axis during the further collection cycle; and
  (iii) further translational position data regarding a translational position of the further directional antenna during the further collection cycle;
processing the further radar data, the further angular position data and the further translational position data collected during each of the further plurality of collection cycles to form further 3D image data representative of the subsurface of infrastructure located in the vicinity of the moving vehicle.

Any method, step or feature described herein in relation to the directional antenna may apply to the further directional antenna axis.

The further antenna rotation axis may be the same as the antenna rotation axis, e.g. as might be the case if the directional antenna and further directional antenna are mounted in an antenna assembly rotated about the antenna rotation axis.

The further collection cycles may be interleaved or performed simultaneously with the collection cycles. Performing the further collection cycles simultaneously with the collection cycles may be useful if there is adequate isolation between the directional antenna and the further directional antenna, which may be achieved such as using different frequency bands or ensuring that the physical geometry minimizes interference. Interleaving the collection cycles and further collections cycles (i.e. performing the collection cycles and further collections cycles alternatively, at different times) may be useful to monitor changes in subsurface conditions over time and/or if there is limited isolation between the directional antenna and the further directional antenna.

The directional antenna and further directional antenna may be configured to emit RF energies having different frequencies.

For example, directional antenna and further directional antenna may be configured to emit UWB pulses having different centre frequencies. For example, the directional antenna may be configured to emit UWB pulses having a centre frequency in the range 250-750 MHz (e.g. 500 MHz) (e.g. which may be useful for detection of larger features in rail infrastructure applications), whereas the further directional antenna may be configured to emit UWB pulses having a centre frequency in the range 1.5 GHz-2.5 GHz (e.g. 2 GHz) (which may be useful for ballast investigation in rail infrastructure applications).

The 3D image data may be used to form a separate image from the further 3D image data. Alternatively, the 3D image data and further 3D image data may be used to form an image in which the further 3D image data is superimposed on the 3D image data.

The vehicle may be a ground-based vehicle, i.e. a vehicle configured to move whilst in contact with the ground.

The vehicle may be a rail vehicle, e.g. a train. However, the vehicle could also be a road vehicle, a water-based vehicle (e.g. a boat) or an aerial vehicle (e.g. an aeroplane, helicopter, airship, unmanned aerial vehicle).

The directional antenna (and one or more other components used in the method) may be included in an apparatus for collecting data for use in forming a 3D image representative of the subsurface of infrastructure located in the vicinity of a moving vehicle, e.g. as described in connection with the second aspect of the invention, below.

A second aspect of the invention relates to an apparatus for collecting data for use in forming a 3D image representative of the subsurface of infrastructure located in the vicinity of a moving vehicle.

For example, a second aspect of the invention may provide an apparatus for collecting data for use in forming a 3D image representative of the subsurface of infrastructure located in the vicinity of a moving vehicle, the apparatus including:
  a base unit configured to be mounted to a vehicle;
  a directional antenna rotatably mounted to the base unit to allow the directional antenna to be rotated about an antenna rotation axis;
  a drive unit configured to rotate the directional antenna about the antenna rotation axis;
  wherein the apparatus is configured to perform, using the directional antenna whilst it is rotated about the antenna rotation axis, and whilst a vehicle to which the base unit is mounted is moving, a plurality of collection cycles in which the directional antenna emits RF energy and collects reflected RF energy;
  wherein the apparatus is configured to collect, during each of the plurality of collection cycles performed by the directional antenna:

(i) radar data representative of reflected RF energy received by the directional antenna during the collection cycle;
(ii) angular position data representative of an angular position of the directional antenna about the antenna rotation axis during the collection cycle; and
(iii) translational position data regarding a translational position of the directional antenna during the collection cycle.

The radar data, the angular position data and the translational position data collected during each of the plurality of collection cycles may subsequently be processed to form 3D image data representative of the subsurface of infrastructure located in the vicinity of the moving vehicle, e.g. according to a method described above in connection with the first aspect of the invention.

The apparatus may be configured to implement, or have means for implementing, any method step described in connection with the first aspect of the invention, e.g. as shall now be discussed.

The apparatus may include a processing unit (e.g. a computer) configured (e.g. programmed) to process the angular position data and the translational position data collected during each of the plurality of collection cycles to form 3D image data representative of the subsurface of infrastructure located in the vicinity of the moving vehicle, e.g. according to a method described above in connection with the first aspect of the invention.

The processing unit may be located on the vehicle or off the vehicle (if the processing unit is located off the vehicle, the The apparatus may include a limb which is rotatable about a pivot/hinge, wherein the antenna is mounted to the limb such that an angle θ between the antenna rotation axis and a direction of movement of a vehicle to which the base unit is mounted can be varied by rotating the limb about that pivot/hinge. The apparatus may include an actuator (e.g. a linear actuator) configured to rotate the limb about the pivot/hinge so as to vary the angle θ.

The directional antenna may be mounted to the base unit via a further pivot/hinge such that an angle φ between a primary radiation axis of the directional antenna and a plane perpendicular to the antenna rotation can be varied, e.g. by rotating the antenna assembly about that pivot/hinge. The apparatus may include an actuator (e.g. a linear actuator) configured to rotate the antenna assembly about the pivot/hinge so as to vary the angle φ.

The directional antenna may include one or more antenna components.

The apparatus may include a device configured to collect the angular position data, e.g. an optical encoder.

The apparatus may include a device configured to collect the translational position data, e.g. a tachometer, laser Doppler encoder, or a GPS device.

The apparatus may include a GPS device configured to collect position data reflecting the position of the directional antenna in a global coordinate system.

The apparatus may include a memory device configured to store the radar data, the angular position data and the translational position data collected during each of the plurality of collection cycles.

The apparatus may include a further directional antenna, which may be configured to implement, or have means for implementing, any method step described in connection with the first aspect of the invention.

For example, the further directional antenna may be rotatably mounted to the base unit to allow the further directional antenna to be rotated about a further antenna rotation axis;
wherein the apparatus includes a further drive unit configured to rotate the further directional antenna about the further antenna rotation axis;
wherein the apparatus is configured to perform, using the further directional antenna whilst it is rotated about the further antenna rotation axis, and whilst a vehicle to which the base unit is mounted is moving, a plurality of further collection cycles in which the further directional antenna emits RF energy and collects reflected RF energy;
wherein the apparatus is configured to collect, during each of the plurality of further collection cycles performed by the further directional antenna:
(i) further radar data representative of reflected RF energy received by the further directional antenna during the further collection cycle;
(ii) further angular position data representative of an angular position of the further directional antenna about the further antenna rotation axis during the further collection cycle; and
(iii) further translational position data regarding a translational position of the further directional antenna during the further collection cycle.

The further antenna rotation axis may be the same as the antenna rotation axis, and the further drive unit may be the same as the drive unit, e.g. as might be the case if the directional antenna and further directional antenna are mounted in an antenna assembly rotated about the antenna rotation axis by the drive unit.

The base unit may be configured to be mounted to a ground-based vehicle, e.g. a rail vehicle.

A third aspect of the invention relates to a computer-readable medium having computer-executable instructions configured to cause a computer to process radar data, angular position data and translational position data to form 3D image data representative of the subsurface of infrastructure located in the vicinity of a moving vehicle.

For example, a third aspect of the invention may provide a computer-readable medium having computer-executable instructions configured to cause a computer to process radar data, angular position data and translational position data collected during each of the plurality of collection cycles to form 3D image data representative of the subsurface of infrastructure located in the vicinity of the moving vehicle, wherein the radar data, angular position data and translational position data has been collected according to a method described above in connection with the first aspect of the invention (excluding the processing step) and/or using an apparatus described above in connection with the second aspect of the invention.

The invention also includes any combination of the aspects and preferred features described except where such a combination is clearly impermissible or expressly avoided.

BRIEF DESCRIPTION OF THE DRAWINGS

Examples of these proposals are discussed below, with reference to the accompanying drawings in which.

DETAILED DESCRIPTION

In general, the following discussion describes examples of our proposals that can be viewed as providing a time-varying incident angle subsurface investigation radar apparatus capable of generating three-dimensional volumetric images. In these examples, an antenna assembly is mechanically rotated allowing data collection from a full three-hundred and sixty-degree arc about the rotation axis. The incidence angle of the incoming radiation therefore varies over the rotation period. The angle θ between the antenna rotation axis and a direction of movement of a vehicle to which a directional antenna is mounted can be varied to achieve higher sampling densities within laterally localized areas, enabling surveys to be conducted more quickly in areas where full angular coverage is not required.

A significant advantage of the examples described below is the ability to produce three-dimensional volumetric images using only a single transect, whilst collecting radar measurements obtained over a diffuse range of positions lateral to a direction of movement of the vehicle to which a directional antenna is mounted.

To create such images with existing systems requires either the use of staggered antenna arrays (two or more rows of antennas, with antennas in each row being offset from antennas in other rows), or using a single antenna to obtain multiple adjacent transects (by obtaining measurements with the single antenna in a first fixed position and then moving the single antenna to a new fixed position to obtain further measurements and so on, which could be seen as staggering the multiple transects in time). However, using staggered antenna arrays is expensive and still suffers from scanning extent restrictions due to size limitations, and using a single antenna to obtain multiple adjacent transects is not feasible for transport applications involving road and rail networks (where measurements may need to be obtained quickly).

Advantageously, the examples described below do not constrain sampling points to lie within discrete vertical planes, so the ratio of lateral to longitudinal sampling density can be comparatively high and the lateral sample distribution is more diffuse. Rotation of the directional antenna allows it to detect and image subsurface features at relatively large distances from the transect, which is advantageous for the evaluation of transport infrastructure; problems occurring outside the scanning region of current systems (e.g. the shoulder ballast 8, the damaged pipe 9 and the void 10 illustrated in FIG. 1) can be identified and corrected with targeted maintenance. For rail specific applications, an oblique incident angle of emitted RF energy (relative to a vertical axis) enables greater ballast evaluation capability under rails, since the wave vector of the emitted RF energy has a horizontal component, allowing the wave to move laterally under the rail (whilst there still is a radar shadow caused by the rails, this shadow is offset from the tracks). Evaluating rail ballast directly under the tracks is important because this is where defects often occur.

Finally, the examples discussed below have a unique capability to inspect retaining walls and tunnels above and to the side of the moving vehicle. A report by the Transportation Research Board of the National Academies in the United States ("Mapping Voids, Debonding, Delaminations, Moisture, and Other Defects Behind or Within Tunnel Linings" published by the Transportation Research Board, Mar. 19, 2015) illustrates, using a fixed antenna, the effectiveness of air-coupled ground penetrating radar ("GPR") to detect large air and water filled voids to a depth of 20 cm within tunnel walls. Using known techniques, smaller defects which could cause concrete delamination may be localized using the exemplified apparatus by determining the surface dielectric permittivity; normal concrete has a bulk relative permittivity of between 8-12. However, voids near the surface will produce backscatter that can interfere with the surface reflection. This will cause a fluctuation in the apparent permittivity calculated from measurements of reflected signal amplitude. The examples discussed below can scan the entire interior surface of a tunnel and locate variations in surface dielectric permittivity that can be further investigated with other diagnostic techniques.

Figure 2:
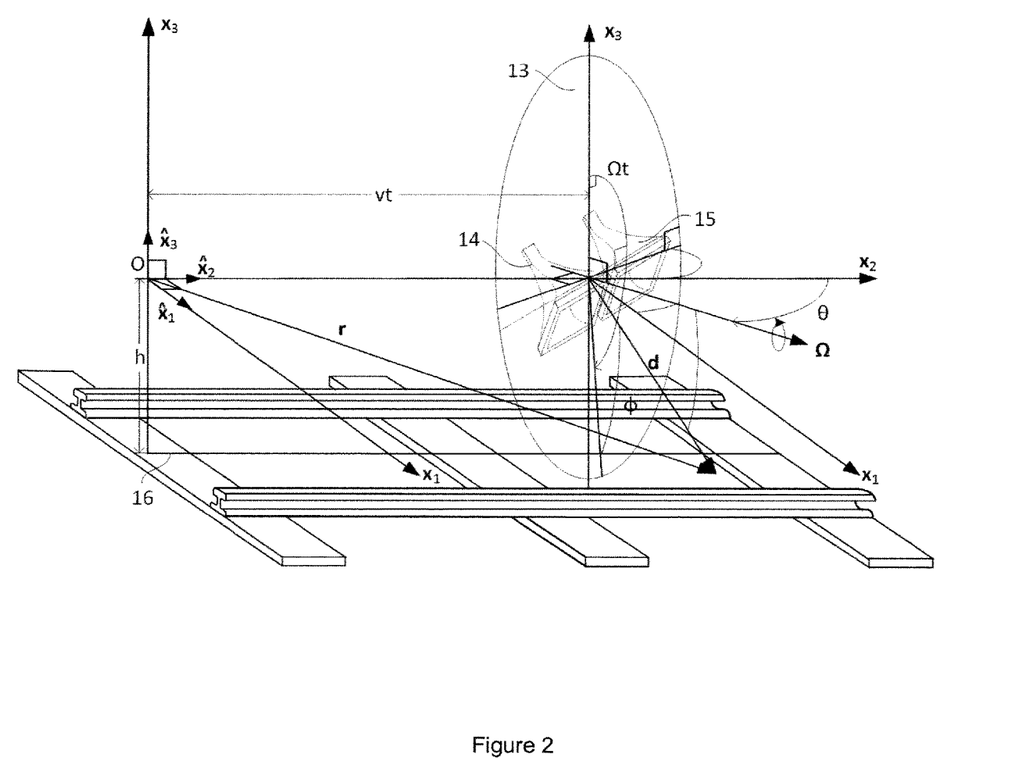
FIG. 2 illustrates the kinematics of an example apparatus for collecting data for use in forming a 3D image representative of the subsurface of infrastructure located in the vicinity of a moving vehicle.

The kinematics of an example apparatus for collecting data for use in forming a 3D image representative of the subsurface of infrastructure located in the vicinity of a moving vehicle are illustrated in FIG. 2.

For clarity, FIG. 2 only illustrates a directional antenna of the example apparatus that includes two antenna components: a transmit horn antenna 14 and a receive horn antenna 15. The transmit horn antenna 14 and the receive horn antenna 15 may be transverse electromagnetic ("TEM") horn antennas.

As shown in FIG. 2, the transmit and receive TEM horn antennas 14, 15 rotate about an antenna rotation axis defined by an angular velocity vector Ω. The transmit and receive TEM horn antennas 14, 15 are positioned directly over a centre line 16 of rail tracks at height h. The angular velocity vector Ω lies in the horizontal plane spanned by $x_1$ and $x_2$, where $x_2$ is a direction of movement of the vehicle, which may be referred to herein as a longitudinal direction and $x_1$ is perpendicular to the direction of movement of the vehicle, which may be referred to herein as a lateral direction.

An angle θ between the antenna rotation axis Ω and the direction of movement of the vehicle $x_2$ is varied to change the angular position of Ω and its associated plane of rotation 13 (a plane perpendicular to the antenna rotation axis Ω). The angular position of the antenna assembly 14 in the plane of rotation 13 is Ωt with respect to $x_3$ (the vertical axis), and the antenna rotation axis Ω can be rotated by angle φ about the vector $(\cos(\theta)\cos(\Omega t), -\sin(\theta)\cos(\Omega t), \sin(\Omega t))$, thereby tilting the boresight vector d out of the plane of rotation 13 such that there is an angle φ between the boresight vector d and the plane of rotation 13.

For the purposes of illustrating the motion of the boresight vector d as shown in FIG. 3(a)-(d), the length of d may be constrained such that:

$$|d| = \frac{h}{\sqrt{(\sin(\phi)\sin(\theta) - \cos(\phi)\cos(\theta)\sin(\Omega t))^2 + \cos^2(\phi)\cos^2(\Omega t)}}$$

which ensures that the tip of the boresight vector d maintains contact with a cylinder of radius h whose centre axis is coincident with the longitudinal axis $x_2$. The parametric space curve describing boresight motion relative to the stationary coordinate system O is then:

$$r(t) = \frac{h}{\sqrt{(\sin(\phi)\sin(\theta) - \cos(\phi)\cos(\theta)\sin(\Omega t))^2 + \cos^2(\phi)\cos^2(\Omega t)}}$$

$$((\sin(\phi)\sin(\theta) - \cos(\phi)\cos(\theta)\sin(\Omega t))\hat{x}_1 +$$

$$(\sin(\phi)\cos(\theta) + \cos(\phi)\sin(\theta)\sin(\Omega t))\hat{x}_2 + \cos(\phi)\cos(\Omega t))\hat{x}_3 + vt\hat{x}_2$$

FIG. 3(a)-(d) illustrate this space curve for increasing values of θ assuming that an antenna assembly including the transmit and receive TEM horn antennas 14, 15 is moving translationally at 45 m/s (162 km/h) at height h=1 with ϕ=0, and rotating at 210 rad/sec (≈2000 rpm).

FIG. 3(a)-(d) correspond to θ having the values 0, 45, 60 and 75 degrees, respectively.

In the examples shown in FIG. 3(b)-(d), the angle θ is changed to a non-zero value such that the primary radiation axis (boresight vector d) of the directional antenna has a component of movement that is opposite to a direction of movement of the rail vehicle whilst the primary radiation axis (boresight vector d) of the directional antenna points beneath the moving vehicle. The minimum distance between adjacent "windings" of the parametric space curve for a particular value of $\Omega t$ is $\ell$ (illustrated in FIG. 3(a)-(d)) which is given approximately by $$\ell \approx \frac{2\pi v}{\Omega}\sqrt{1 - \left(\hat{x}_2 \cdot \frac{\frac{\partial r}{\partial t}}{\left|\frac{\partial r}{\partial t}\right|}\right)^2}, \frac{\partial r(t)}{\partial t}$$

$$= \frac{h\Omega\cos(\phi)}{(\cos^2(\phi)\cos^2(\Omega t) + (\cos(\phi)\cos(\theta)\sin(\Omega t) - \sin(\phi)\sin(\theta))^2)^{\frac{3}{2}}}$$

$$(\cos(\phi)\cos(\Omega t)(\sin(\phi)\sin(\theta)\sin(\Omega t) - \cos(\phi)\cos(\theta))\hat{x}_1 +$$

$$\sin(\theta)\cos(\Omega t)\hat{x}_2 - (\cos(\phi)\cos(\theta)\sin(\Omega t) - \sin(\phi)\sin(\theta))(\cos(\phi)$$

$$\cos(\theta) - \sin(\phi)\sin(\theta)\sin(\Omega t))\hat{x}_3) + v\hat{x}_2, \left|\frac{\partial r(t)}{\partial t}\right|$$

$$= \frac{h\Omega\cos(\phi)}{(\cos^2(\phi)\cos^2(\Omega t) + (\cos(\phi)\cos(\theta)\sin(\Omega t) - \sin(\phi)\sin(\theta))^2)^{\frac{3}{2}}}$$

$$(\cos^2(\phi)\cos^2(\Omega t)(\sin(\phi)\sin(\theta)\sin(\Omega t) - \cos(\phi)\cos(\theta))^2 +$$

$$\left(\sin(\theta)\cos(\Omega t) + \left(\frac{(\cos^2(\phi)\cos^2(\Omega t) + (\cos(\phi)\cos(\theta)\sin(\Omega t) - \sin(\phi)\sin(\theta))^2)^{\frac{3}{2}}}{h\Omega\cos(\phi)}\right)v\right)^2 +$$

$$(\cos(\phi)\cos(\theta)\sin(\Omega t) - \sin(\phi)\sin(\theta))^2(\cos(\phi)\cos(\theta) - \sin(\phi)$$

$$\sin(\theta)\sin(\Omega t))^2\}^{1/2}$$

Thus, the minimum distance $\ell$ separating adjacent segments of the curve in the region where the cylinder of unit radius contacts the ground plane (directly underneath the vehicle) decreases from approximately 1.25 m in (a) to 0.375 m in (d). The reciprocal of $\ell$ yields the linear sampling density along a line segment that is in the ground plane and is approximately perpendicular to ∂r(t)/∂t at the point where the space curve intercepts the ground plane. The effect of increasing θ is to improve the sampling density from 0.8 samples/m to 2.67 samples/m along this line segment. Another measure of linear sampling density is along the space curve itself, which can be calculated by using Linear Sampling Density along Space Curve.=(scans/sec)/|∂r(t)/∂t|, where (scans/sec) is the number of scans per second given by the pulse repetition frequency (PRF) of the radar divided by the number of pulses per stack (a scan is functionally equivalent to a trace). The two dimensional sampling density, abbreviated as S.D., is measured in samples/m² and is the product of the two aforementioned linear sampling densities:

$$S.D. \approx \frac{\Omega\left(\frac{scans}{sec}\right)}{2\pi v}\sqrt{\frac{1}{\left|\frac{\partial r}{\partial t}\right|^2 - \left(\hat{x}_2 \cdot \frac{\partial r}{\partial t}\right)^2}}$$

From the above equation, it can be seen that the greater |∂r(t)/∂t|, the lower the S.D., as the antenna spends less time over a particular point. Therefore the sample density is inversely proportional to velocity.

Figure 3:
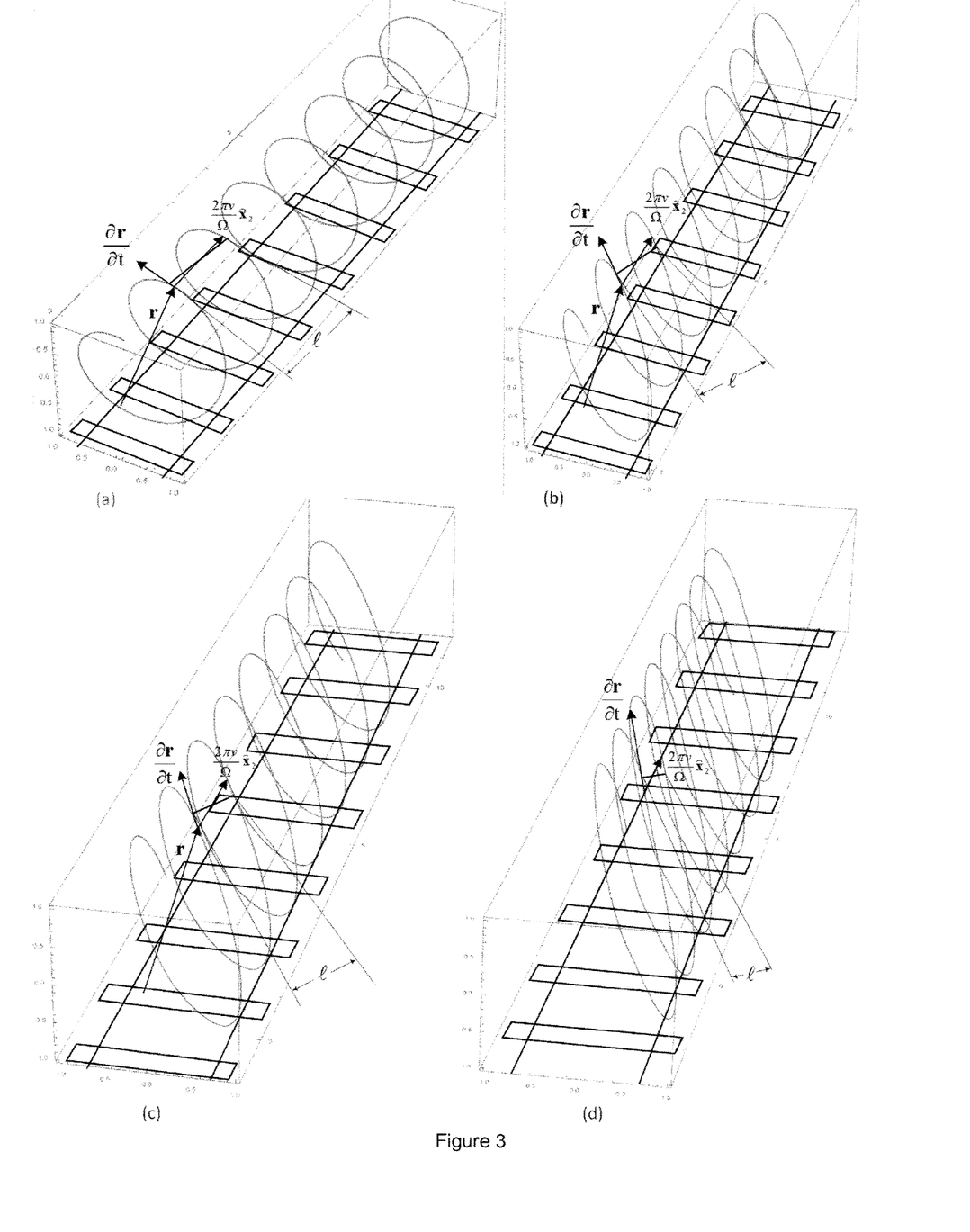
FIG. 3(a)-(d) illustrates a space curve describing boresight motion relative to a stationary coordinate system O for the example apparatus of FIG. 2 for θ having the values of (a) 0 degrees, (b) 45 degrees, (c) 60 degrees and (d) 75 degrees.

Of course, any increase of scan density below the vehicle results in a lessening of scan density above the vehicle. However the distance between adjacent "windings" of the space curve helix will increase as shown in FIG. 3. Thus, it may be desirable to find the best balance of along curve and perpendicular to curve resolution as a function of θ for a particular antenna rotation rate and vehicle speed, accounting for the region to be scanned.

Additionally, |∂r(t)/∂t| changes with θ, so an optimal value of θ can be found which minimizes |∂r(t)/∂t| and hence maximizes the linear sampling density along the space curve in a region of interest (which could e.g. be the ground plane, or a tunnel or retaining wall). This demonstrates the effectiveness of varying θ for maximizing the sampling densities both along and perpendicular to the space curve at the ground plane. When uniform sampling is required over three-hundred and sixty-degrees (such as when finding the surface impedance function of a tunnel interior) θ can be set to zero (shown in FIG. 3(a)), which will necessitate a reduced vehicle speed. For most rail applications, only the track and adjacent regions need investigation, and so θ can be selected depending on Ω, the lateral size of the region of interest, the sampling density needed, and the vehicle speed.

Figure 4:
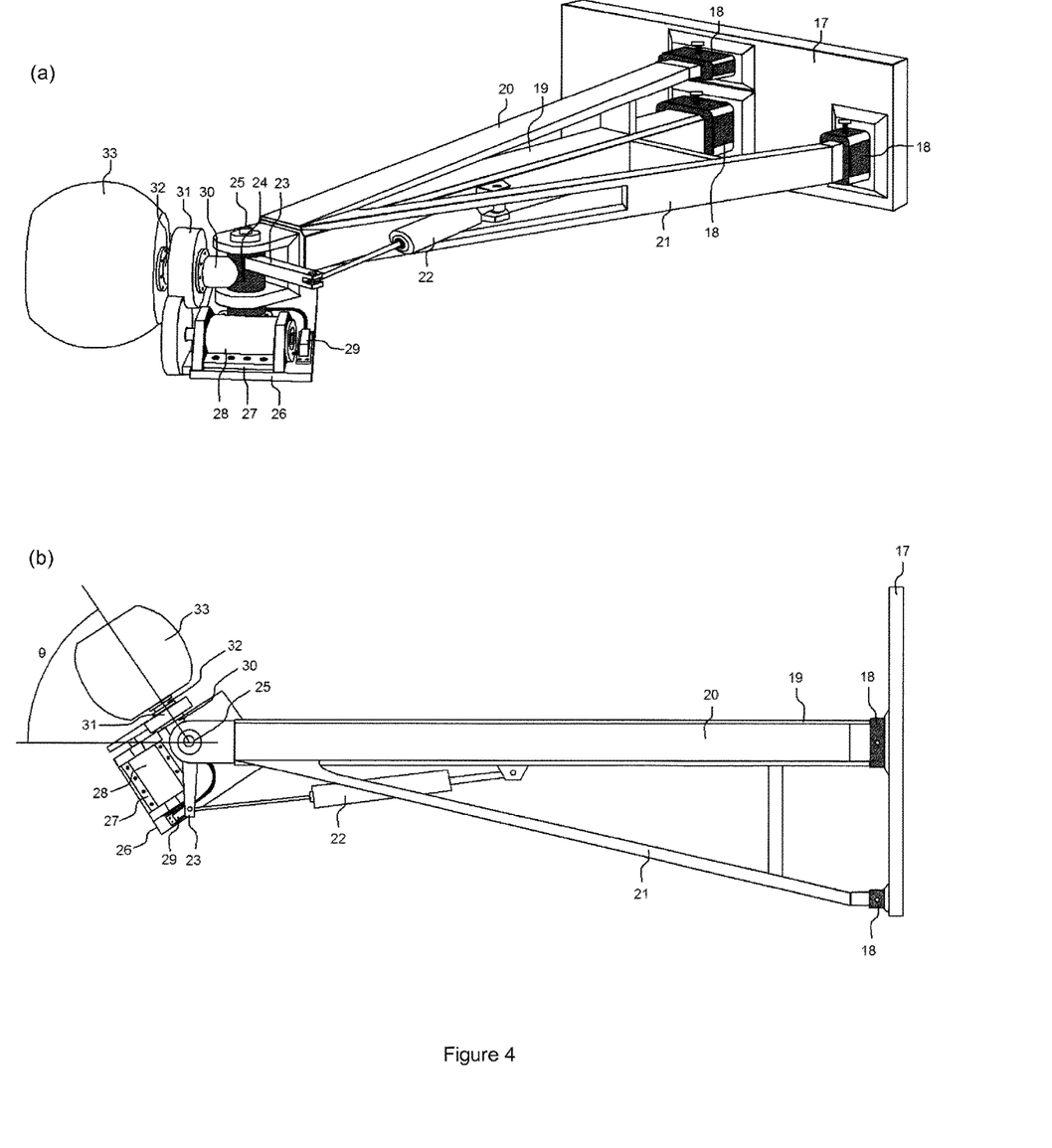
FIG. 4(a) and FIG. 4(b) shows the example apparatus of FIG. 2 in further detail.

The example apparatus for collecting data for use in forming a 3D image representative of the subsurface of infrastructure located in the vicinity of a moving vehicle is shown in more detail in FIG. 4(a) and FIG. 4(b).

The apparatus has a mounting plate 17 configured to be mounted to the vehicle, which carries brackets 18 that secure the longitudinal beam 19 and the stabilizing beams 20 and 21 to the plate. Preferably, the beam 19 is long enough to prevent the vehicle itself from blocking the radar boresight when θ is large (although as noted previously, some negative effects of a large θ can be mitigated by varying φ to be non-zero). The beams 20 and 21 act to stabilize the longitudinal beam against vertical and lateral motion, respectively. A linear actuator 22 connected to a moment arm 23 controls the value of θ through the pivot point 24. A platform 26 connected to the pivot carries an electric drive motor 28 in a mount 27, as well as associated control electronics 29. A drive axle 32 is attached to a non-rotating axle 30 through a gear assembly 31 which contains a high speed ball bearing for this purpose. This assembly also contains helical gears enabling the electric motor to rotate antenna assembly 33. Optical encoder 25 on the pivot and another optical encoder on the drive axle are configured to transmit data to the control unit which records angular position data corresponding to each trace (a trace=radar data representative of reflected RF energy as a function of depth received by the directional antenna during a collection cycle).

Translational position data is attributed to each trace using tachometer and optionally GPS inputs. Normally, a tachometer would only give linear information, so position data collected by a GPS device may be used to take curves in a track into account and/or to map subsequently formed 3D image data (see below) to a global coordinate system.

Data about vehicle speed may be used to vary both θ and Ω in real time.

Components 17-33 of the apparatus can be viewed as a base unit configured to be mounted to a vehicle.

An antenna assembly 33 contains the directional antenna, a radar transceiver and an analogue to digital converter. The antenna assembly 33 is mounted to the rail vehicle using with connection point 34 via the drive axle 32, thereby allowing the drive motor 28 to rotate the antenna assembly 33 and therefore the directional antenna contained in the antenna assembly 33. The antenna assembly 33 is connected to a processing unit (not shown) located in the base unit, via single mode fibre optic cable (a fibre optic rotary joint is used).

Figure 5:
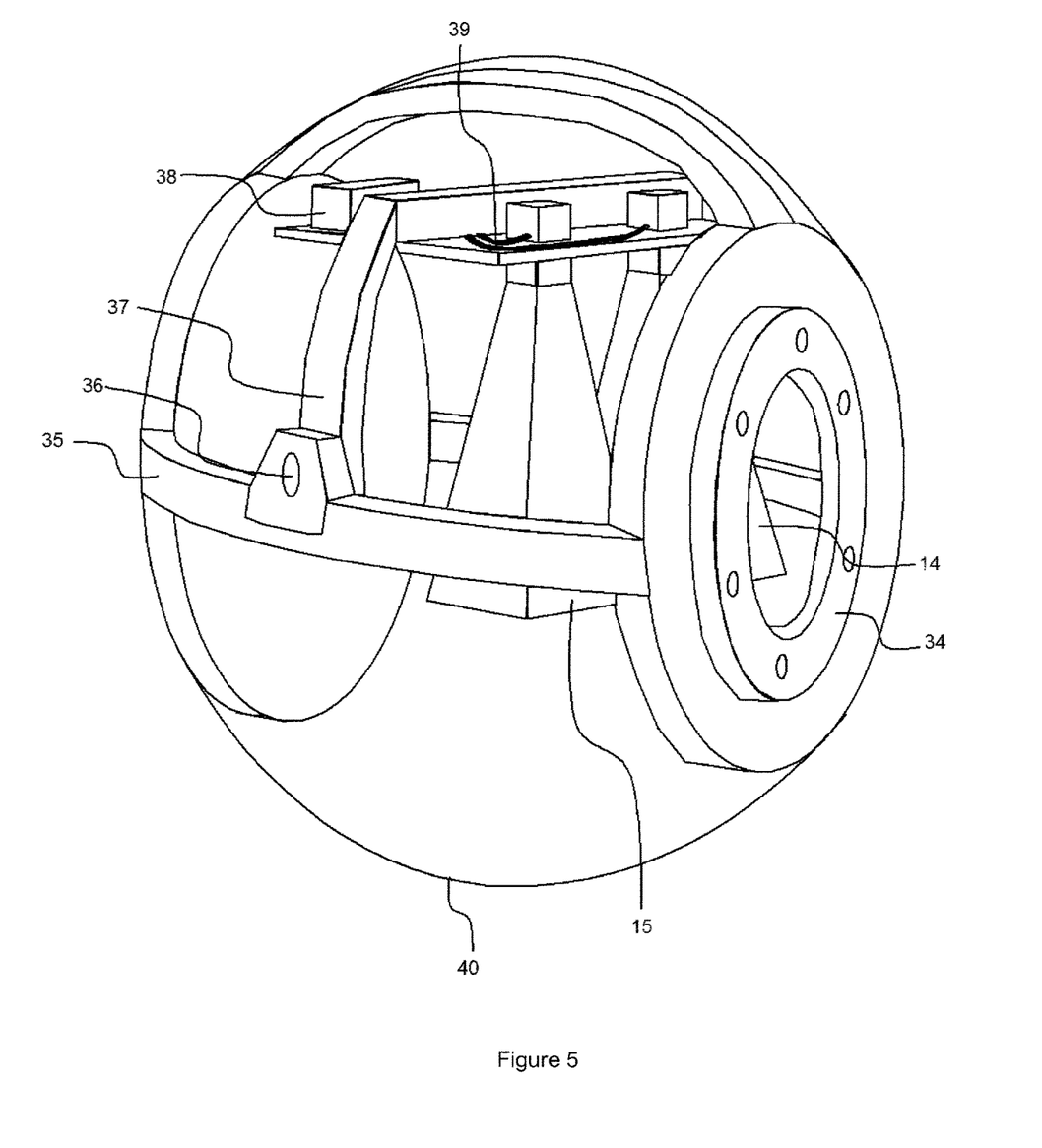
FIG. 5 shows the antenna assembly from the example apparatus of FIG. 2 in further detail.

The antenna assembly 33 is shown in more detail FIG. 5. The transmit and receive TEM horn antennas 14, 15 of the directional antenna are mounted on an inner gimbal 37 which allows angle φ to be varied; this gimbal rotates about the axis specified by 36. The truncated spherical shape of the cover of the antenna assembly 33 allows φ to vary up to 45 degrees. An outer gimbal 35 is rotated by the drive axle with angular velocity Ω thereby rotating the entire antenna assembly 33 about Ω. The TEM horns are connected to the transceiver 38 using a 50 Ohm coaxial cable 39. A bottom of the assembly cover 40 consists of radio frequency transparent material.

The apparatus thus performs, using the directional antenna whilst it is rotated about the antenna rotation axis Ω, a plurality of collection cycles in which the transmit horn antenna 14 of the directional antenna emits RF energy and the receive horn antenna 15 of the directional antenna receives reflected RF energy.

During each of the plurality of collection cycles performed by the directional antenna, the processing unit located in the base unit collects:
  (i) radar data representative of reflected RF energy received by the receive horn antenna 15 of the directional antenna during the collection cycle;
  (ii) angular position data (from the optical encoders) representative of an angular position of the directional antenna about the antenna rotation axis Ω during the collection cycle; and
  (iii) translational position data (from the tachometer and optionally the GPS device) regarding a translational position of the directional antenna during the collection cycle.

All collected data is stored in a local hard disk included in the base unit. At a later time, a computer is used to processing the radar data, the angular position data and the translational position data collected during each of the plurality of collection cycles to form 3D image data representative of the subsurface of infrastructure located in the vicinity of the moving vehicle.

Associated with each sampling point on the ground, a reflection profile (known as a trace) exists. This is essentially a one dimensional set of reflection amplitude data (along a line) which the subsurface dielectric permittivity as a function of distance/depth. By knowing the precise linear and angular position of the antenna when a trace was taken, it is possible to determine the equation of that line in space and assign reflection amplitudes along it. By interpolating this data between all such lines in 3D space a 3D map of the subsurface can be obtained. Of course, this is only a very simple outline. Preferably, variations in surface impedance and topography would be compensated for to obtain the best possible imagery, which can be achieved using techniques known in the art.

Accordingly, it would be straightforward for one skilled in the art to convert the data into basic 3D image data. More sophisticated algorithms could be envisaged to obtain a high quality 3D image, e.g. by compensating for variations in surface impedance and topography. Even when obtaining a basic 3D image, the calculations involved are computationally intensive, which is why offline processing is used in this example, though there is no fundamental reason why this processing could not be performed "on the fly" by a computer on board the apparatus.

Although the antenna assembly 33 shown in FIG. 5 only includes a single directional antenna that includes transmit and receive TEM horn antennas 14, 15, the antenna assembly 33 may in some embodiments (not shown) include a further directional antenna that includes further transmit and receive TEM horn antennas. The further directional antenna may be used whilst it is rotated about the antenna rotation axis Ω to perform a plurality of further collection cycles in which the further directional antenna emits RF energy and receives reflected RF energy. As has already been described in detail above, the directional antenna and further directional antenna may be configured to emit RF energies having different frequencies.

Although the example apparatus is described for a rail vehicle, the example mechanism could be used with another ground-based vehicle, e.g. a road vehicle.

It would also be possible to use the mechanism with a water-based vehicle, preferably with compensation for yaw/pitch of the water-base vehicle being provided (either in the processing of the data or to prevent the antenna assembly from being affected by the yaw/pitch).

It would also be possible to use the mechanism with an aerial vehicle, preferably with an inertial measurement unit being provided to compensate for yaw, pitch and roll, and preferably with a GPS device being used to obtain positional data. In the case of an aerial vehicle, there would most likely be altitude constraints beyond which meaningful subsurface data would not be obtained.

In the example apparatus, a pulsed UWB radar technique is employed, meaning that non-dispersive antennas should be used. Although TEM horn antennas are used as the non-dispersive antennas in this example, these TEM horn antennas could be replaced by another type of non-dispersive antenna, e.g. a loaded dipole antenna. If another (non-pulsed) radar technique were used, other types of antenna could be used.

The performance of any subsurface radar is dependent upon the electrical conductivity of the ground. Soils with high conductivity absorb radio frequency energy resulting in the rapid attenuation of electromagnetic radiation. Soils that are capable of holding high amounts of water and have a high cation-exchange capacity (the CEC is the total number of positive ions, or cations, a particular soil can hold) are not suitable for radar investigations. Clay, which is typically considered to be soil comprised of particles of 2 μm or less, is an example of this; the small particle size results in high particle density and the correspondingly large total surface area holds high water amounts compared to other soil types. This above described apparatus may have difficulty imaging subsurface features if clay with high moisture content is predominant, and might not function if the infrastructure under investigation is flooded.

The example apparatus described above could be used for all manner of radar subsurface investigations. Most ground penetrating radar units used for conventional scanning use ground-coupled antennas, whereas the example apparatus described above is an air-coupled system. Ground-coupled systems transfer more energy into the ground because the antenna impedance is matched to that of the ground surface, hence the transmitted impulse propagates through the interface with low reflection. They therefore have better depth penetration than their air-coupled equivalents, however surface impedance can fluctuate rapidly over short distances so in practice it is impossible to always match the antenna with the ground. This mismatch will cause the antenna to ring, which results in obscured features and poor quality images. This problem is particularly difficult to remove through background removal processing, especially for large impedance variations. Air-coupled radar does not suffer from this problem as severely, and so can produce higher quality images at the expense of reduced penetration depth. Air coupled radar also has much higher data collection speeds and can be used more effectively over difficult or dangerous terrain (for example land mine clearance).

The example apparatus described above could reduce the time required to complete a scan because its effective transect width is much larger than current systems. Fewer transects would be needed to survey a site, yielding both time and cost savings. The areas where this technology could be applied include utility location, forensics, archaeology, construction surveys, sinkhole/void detection, and unexploded ordnance/landmines.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the antenna assembly 33 could be changed depending upon investigative requirements, or a different drive system could be used to rotate the antenna assembly (for example, a belt drive system).

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The invention claimed is:

1. A method for forming 3D image data representative of the subsurface of infrastructure located in the vicinity of a moving vehicle, the method including:
   rotating a directional antenna, mounted to the moving vehicle, about an antenna rotation axis;
   performing, using the directional antenna whilst it is rotated about the antenna rotation axis, a plurality of collection cycles in which the directional antenna emits RF energy and receives reflected RF energy;
   collecting, during each of the plurality of collection cycles performed by the directional antenna:
   (i) radar data representative of reflected RF energy received by the directional antenna during the collection cycle;
   (ii) angular position data representative of an angular position of the directional antenna about the antenna rotation axis during the collection cycle; and
   (iii) translational position data regarding a translational position of the directional antenna during the collection cycle;
   processing the radar data, the angular position data and the translational position data collected during each of the plurality of collection cycles to form 3D image data representative of the subsurface of infrastructure located in the vicinity of the moving vehicle;
   wherein the method includes varying an angle θ between the antenna rotation axis and a direction of movement of the vehicle to a non-zero value such that a primary radiation axis of the directional antenna has a component of movement that is opposite to a direction of movement of the vehicle whilst the primary radiation axis of the directional antenna points beneath the moving vehicle.

2. A method according to claim 1, wherein the method includes varying an angle θ between the antenna rotation axis and a direction of movement of the vehicle.

3. A method according to claim 1, wherein the method includes varying an angle φ between a primary radiation axis of the directional antenna and a plane perpendicular to the antenna rotation axis.

4. A method according to claim 1, wherein the RF energy emitted by the directional antenna during each collection cycle includes an ultra-wideband pulse.

5. A method according to claim 1, wherein the directional antenna includes a transmit horn antenna configured to emit the RF energy and a receive horn antenna configured to receive reflected RF energy.

6. A method according to claim 1, wherein the method includes using position data collected by a GPS device to map the 3D image data to a global coordinate system.

7. A method according to claim 1, wherein the method additionally includes:
- rotating a further directional antenna, mounted to the moving vehicle, about a further antenna rotation axis;
- performing, using the further directional antenna whilst it is rotated about the further antenna rotation axis, a plurality of further collection cycles in which the further directional antenna emits RF energy and receives reflected RF energy;
- collecting, during each of the plurality of further collection cycles performed by the further directional antenna:
  (i) further radar data representative of reflected RF energy received by the further directional antenna during the further collection cycle;
  (ii) further angular position data representative of an angular position of the further directional antenna about the further antenna rotation axis during the further collection cycle; and
  (iii) further translational position data regarding a translational position of the further directional antenna during the further collection cycle;
- processing the further radar data, the further angular position data and the further translational position data collected during each of the further plurality of collection cycles to form further 3D image data representative of the subsurface of infrastructure located in the vicinity of the moving vehicle.

8. A method according to claim 7, wherein the directional antenna and further directional antenna may be configured to emit RF energies having different frequencies.

9. A method according to claim 8, wherein the directional antenna is configured to emit UWB pulses having a centre frequency in the range 250-750 MHz whereas the further directional antenna is configured to emit UWB pulses having a centre frequency in the range 1.5 GHz-2.5 GHz.

10. A method according to claim 1, wherein the vehicle is a rail vehicle.

11. An apparatus an apparatus for collecting data for use in forming a 3D image representative of the subsurface of infrastructure located in the vicinity of a moving vehicle, the apparatus including:
- a base unit configured to be mounted to a vehicle;
- a directional antenna rotatably mounted to the base unit to allow the directional antenna to be rotated about an antenna rotation axis;
- a drive unit configured to rotate the directional antenna about the antenna rotation axis;
- wherein the apparatus is configured to perform, using the directional antenna whilst it is rotated about the antenna rotation axis, and whilst a vehicle to which the base unit is mounted is moving, a plurality of collection cycles in which the directional antenna emits RF energy and collects reflected RF energy;
- wherein the apparatus is configured to collect, during each of the plurality of collection cycles performed by the directional antenna:
  (i) radar data representative of reflected RF energy received by the directional antenna during the collection cycle;
  (ii) angular position data representative of an angular position of the directional antenna about the antenna rotation axis during the collection cycle; and
  (iii) translational position data regarding a translational position of the directional antenna during the collection cycle;
- wherein the apparatus is configured to vary an angle $\theta$ between the antenna rotation axis and a direction of movement of the vehicle to a non-zero value such that a primary radiation axis of the directional antenna has a component of movement that is opposite to a direction of movement of the vehicle whilst the primary radiation axis of the directional antenna points beneath the moving vehicle.

12. An apparatus according to claim 10, wherein the apparatus includes a limb which is rotatable about a pivot/hinge, wherein the antenna is mounted to the limb such that the angle $\theta$ can be varied by rotating the limb about the pivot/hinge.

13. An apparatus according to claim 11, wherein the apparatus includes a processing unit configured to process the angular position data and the translational position data collected during each of the plurality of collection cycles to form 3D image data representative of the subsurface of infrastructure located in the vicinity of the moving vehicle.

14. A computer-readable medium having computer-executable instructions configured to cause a computer to process radar data, angular position data and translational position data collected during each of the plurality of collection cycles to form 3D image data representative of the subsurface of infrastructure located in the vicinity of the moving vehicle, wherein the radar data, angular position data and translational position data has been collected according to a method for forming 3D image data representative of the subsurface of infrastructure located in the vicinity of a moving vehicle, the method including:
- rotating a directional antenna, mounted to the moving vehicle, about an antenna rotation axis;
- performing, using the directional antenna whilst it is rotated about the antenna rotation axis, a plurality of collection cycles in which the directional antenna emits RF energy and receives reflected RF energy;
- collecting, during each of the plurality of collection cycles performed by the directional antenna:
  (i) radar data representative of reflected RF energy received by the directional antenna during the collection cycle;
  (ii) angular position data representative of an angular position of the directional antenna about the antenna rotation axis during the collection cycle; and
  (iii) translational position data regarding a translational position of the directional antenna during the collection cycle;
- processing the radar data, the angular position data and the translational position data collected during each of the plurality of collection cycles to form 3D image data representative of the subsurface of infrastructure located in the vicinity of the moving vehicle;
- wherein the method includes varying an angle $\theta$ between the antenna rotation axis and a direction of movement of the vehicle to a non-zero value such that a primary radiation axis of the directional antenna has a component of movement that is opposite to a direction of movement of the vehicle whilst the primary radiation axis of the directional antenna points beneath the moving vehicle.

* * * * *